United States Patent
Kavadimatti et al.

(10) Patent No.: US 11,595,266 B2
(45) Date of Patent: Feb. 28, 2023

(54) METHODS AND APPARATUS TO DETECT DRIFT IN A HYBRID CLOUD ENVIRONMENT

(71) Applicant: VMware, Inc., Palo Alto, CA (US)

(72) Inventors: Santoshkumar Kavadimatti, Bangalore (IN); Chandrashekhar Jha, Bangalore (IN); Gerin Jacob, Bangalore (IN); Naveen Mudnal, Bangalore (IN); Rajat Garg, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/654,051

(22) Filed: Oct. 16, 2019

(65) Prior Publication Data

US 2021/0028993 A1  Jan. 28, 2021

(30) Foreign Application Priority Data

Jul. 23, 2019  (IN) .............................. 201941029765

(51) Int. Cl.
*H04L 41/14* (2022.01)
*G06F 9/455* (2018.01)
(Continued)

(52) U.S. Cl.
CPC ........ *H04L 41/145* (2013.01); *G06F 9/45558* (2013.01); *G06F 9/54* (2013.01);
(Continued)

(58) Field of Classification Search
CPC ... H04L 41/12; H04L 41/145; H04L 41/0806; H04L 41/0813; H04L 41/0816;
(Continued)

(56) References Cited

U.S. PATENT DOCUMENTS 8,171,485 B2    5/2012  Muller
9,191,380 B2 *  11/2015 Anderson ............. H04L 9/3213
(Continued)

FOREIGN PATENT DOCUMENTS

CN    106155759 A  * 11/2016
KR    102338652 B1 * 12/2021

*Primary Examiner* — Glenton B Burgess
*Assistant Examiner* — Rachel J Hackenberg
(74) *Attorney, Agent, or Firm* — Hanley, Flight & Zimmerman, LLC

(57) ABSTRACT

Methods, apparatus, systems and articles of manufacture are disclosed to detect drift in a hybrid cloud environment. An example apparatus to detect drift in a hybrid cloud environment includes a configuration model determiner to, after deployment of a blueprint in the hybrid cloud environment, generate a first model including first relationships of a first plurality of resources corresponding to the blueprint, the blueprint including a plurality of properties in which at least one of the plurality of properties is agnostic of type of cloud, an inventor model determiner to generate a second model including second relationships of a second plurality of resources as deployed in the hybrid cloud environment based on the blueprint, and a drift determiner to determine a drift value based on the first relationships and the second relationships, the drift value representative of a difference between the first relationships and the second relationships.

24 Claims, 11 Drawing Sheets

(51) Int. Cl.
*H04L 67/10* (2022.01)
*H04L 41/0806* (2022.01)
*G06F 9/54* (2006.01)

(52) U.S. Cl.
CPC .......... *H04L 41/0806* (2013.01); *H04L 67/10* (2013.01); *G06F 2009/45595* (2013.01)

(58) Field of Classification Search
CPC . H04L 41/082; H04L 41/085; H04L 41/0866; H04L 41/0654; H04L 41/5045; H04L 67/10; H04L 67/1008; H04L 67/1095; H04L 67/1097; H04L 67/1012; H04L 67/1034; H04L 67/1036; H04L 67/1031; H04L 67/1029; G06F 9/45558; G06F 9/45562; G06F 9/4557; G06F 9/45575; G06F 9/45579; G06F 9/45583; G06F 9/45587; G06F 9/45591; G06F 9/45595; G06F 11/3664; G06F 11/3668; G06F 11/3608; G06F 11/3447; G06F 8/35; G06F 8/60; G06F 2009/4557; G06F 21/604; G06F 9/54; G06F 2009/45595
See application file for complete search history.

(56) References Cited

U.S. PATENT DOCUMENTS

| | | | | |
|---|---|---|---|---|
| 9,292,350 | B1* | 3/2016 | Pendharkar | G06F 9/5044 |
| 10,505,805 | B1* | 12/2019 | Viswanathan | H04L 41/0863 |
| 10,521,325 | B2* | 12/2019 | Pan | H04L 41/0843 |
| 10,536,356 | B2* | 1/2020 | Zhong | H04L 43/0817 |
| 2013/0291052 | A1* | 10/2013 | Hadar | G06F 21/6218 726/1 |
| 2013/0324121 | A1* | 12/2013 | Kwon | H04W 4/70 455/435.1 |
| 2014/0019597 | A1* | 1/2014 | Nath | H04L 41/0843 709/220 |
| 2015/0304175 | A1* | 10/2015 | Maes | H04L 41/5054 709/226 |
| 2016/0105489 | A1* | 4/2016 | Llorca | G06F 9/50 709/226 |
| 2018/0316560 | A1* | 11/2018 | Malliga | H04L 41/0859 |
| 2018/0322558 | A1* | 11/2018 | Padmanabh | G06Q 30/0603 |
| 2020/0110640 | A1* | 4/2020 | Asthana | G06F 9/5072 |

* cited by examiner

```
501  formatVersion: 1
502  Inputs: {}
503  resources:
504    Cloud_Machine_1:
505      type: Cloud.Machine
506      properties:
507        image: 'ubuntu'
508        flavor: 'small'
509        attachedDisks:
510          - source: '${resource.Cloud_Volume_1.id}'
511    Cloud_Volume_1:
512      type: Cloud.Volume
513      properties:
514        capacityGb: 1
```

FIG. 5

METHODS AND APPARATUS TO DETECT DRIFT IN A HYBRID CLOUD ENVIRONMENT

RELATED APPLICATIONS

Benefit is claimed under 35 U.S.C. 119(a)-(d) to Foreign Application Serial No. 201941029765 filed in India entitled "METHODS AND APPARATUS TO DETECT DRIFT IN A HYBRID CLOUD ENVIRONMENT", on Jul. 23, 2019, by VMWARE, INC., which is herein incorporated in its entirety by reference for all purposes.

FIELD OF THE DISCLOSURE

This disclosure relates generally to cloud computing, and, more particularly, to methods and apparatus to detect drift in a hybrid cloud environment.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

FIG. 5 is example pseudocode representative of machine readable instructions that may be executed to implement the blueprint of FIG. 1.

Figure 1:
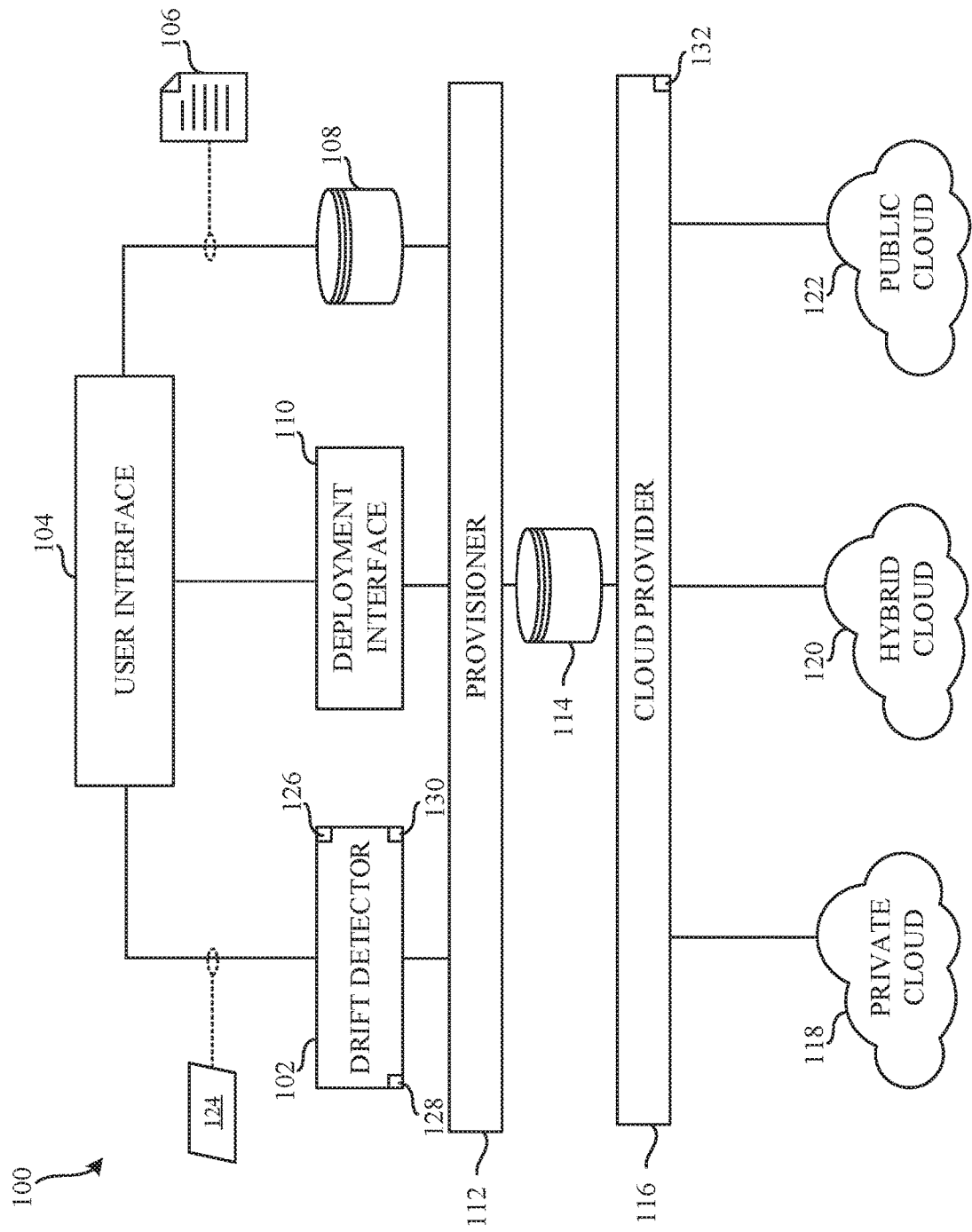
FIG. 1 illustrates an example hybrid cloud environment including an example drift detector.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other, Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing, services and applications. Examples for virtualizing computer systems are disclosed in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in its entirety.

Certain examples provide multi-cloud management systems and/or platforms that manage a combination of public and private clouds (e.g., a hybrid cloud environment) running a variety of computing processes from traditional processes to virtual machines to container (e.g., cloud native) workloads. An example multi-cloud management platform can provision infrastructure and application resources with a choice of consumption (e.g., application programming interface (API), catalog, command line interface (CLI), etc.) based on pre-defined policies and permissions. Provisioning and maintenance of resources are automated through creation of blueprints (e.g., models) that include components of requested services along with their relationships, including a mix of VM and container-based services. Integration can be extended to third-party and/or customer applications, tools, etc.

In a virtual infrastructure, such as a multi-cloud management platform, an endpoint (e.g., a cloud) is a system and/or a service on which a user can provision resources. The endpoint may be a public cloud resource (e.g., a web service such as Amazon Web Services (AWS), etc), a virtual appliance (e.g., an external orchestrator appliance, etc.), a private cloud (e.g., hosted by VMware vSphere™, Microsoft Hyper-V™, etc.), etc. As used herein, type of cloud refers to whether any of a public cloud, a private cloud, and/or a hybrid cloud is cloud-agnostic or cloud-non-agnostic. For example, a cloud-agnostic public cloud may be referred to as being a type that is cloud-agnostic and/or agnostic of type. For example, a service has an endpoint that provides a specific function or feature of that service. The service may have multiple endpoints. For example, a catalog service provides catalog features via an endpoint for a shell/user interface application service to consume. Endpoints can include physical endpoints, virtual endpoints, Internet Protocol Address Management (IPAM) endpoints, etc. An endpoint type defines a set of one or more methods/functions that can be invoked, and an endpoint or endpoint instance is the object that implements or provides access to the methods/functions. An endpoint adapter enables the endpoint and the management system to communicate with each other. The endpoint adapter can facilitate/enable data/instruction communication, security, access control, redundancy, auditing, etc. If properly registered, an infrastructure-driven workflow can be launched for the endpoint via the endpoint adapter, for example.

Often, provisioned resources are configured during provisioning of infrastructure. Such configuration is often specific to the intended public cloud resource, private cloud resource, IaaS provider, and/or any suitable cloud resource. It is hard to implement such a configuration when using a provisioning platform that is cloud-agnostic, as it is not known where the resource will be placed before the actual provisioning happens (e.g., the selected public and/or private cloud is not known). In examples disclosed herein, a cloud-agnostic system is a system that manages a hybrid cloud environment including more than one type of cloud (e.g., AWS, Microsoft Azure, Google Compute Platform (GCP), VMware vSphere) and places the requested workloads, resources, etc., and/or provisions the requests based on a set of rules and/or properties. For example, the set of rules and/or properties may be based on constraints such as desired cost, desired memory allocation, desired load size, etc.

Cloud-based services such as VMware Cloud Assembly allow a user to create and/or otherwise deploy machines, applications, and/or services to a cloud infrastructure. Cloud-based services (e.g., VMware Cloud Assembly) is a blueprint development and deployment service. A deployment in a cloud-based service (e.g., VMware Cloud Assembly) is a provisioned instance of a blueprint. As used herein, blueprints are specifications that define the machines, applications, and/or services that can be deployed to cloud resources. Blueprints may be developed to target specific cloud vendors and/or resources (e.g., Amazon Web Services (AWS), a virtual appliance such as an external orchestrator appliance, etc., VMware vSphere™, Microsoft Hyper-V™, etc.). Additionally or alternatively, blueprints may be developed for use in a cloud-agnostic system. The creation of blueprints is typically performed as an infrastructure-as-code (IaC) process. Utilizing an IaC process enables the ability to safely predict and/or otherwise manage the lifecycle of the infrastructure using declarative code.

Deployments of an infrastructure using an IaC process may encounter drift. As used herein, drift is defined as the deviation of the real-world state of an infrastructure from the state defined in the configuration (e.g., the blueprint). A drift value in a deployment may occur when one or more resources defined in a blueprint are not actually instantiated have been terminated and/or have failed (e.g., broken, etc.). Additionally or alternatively, a drift value in a deployment may occur in response to manual changes to the configuration (e.g., the blueprint) and/or the real-world infrastructure that cause resource instantiations in the actual deployment to differ from defined in the blueprint. For example, a change in a real-world environment may occur using a software development kit (SDK), a command-line interface (CLI), a console, and/or any other suitable tools (e.g., through a virtual machine client). In some instances, the changes to the configuration (e.g., the blueprint) and/or the real-world environment may be accidental and/or intentional (e.g., altering the allocation of processing resources in order to respond to time-sensitive operational events). In such example instances, changes made outside of a cloud-based provisioning service (e.g., VMware Cloud Assembly) may disrupt deployment, update, and/or blueprint iteration operations due to discontinuities that may now exist between the blueprint and newly changed cloud-based provisioning service (e.g., resource(s) may no longer be available, etc.)

Examples disclosed herein include methods and apparatus to detect a drift in a hybrid cloud environment. Furthermore, examples disclosed herein enable resource and deployment drift detection by creating a first model (e.g., a configuration model) of resources and relationships in a blueprint. In addition, examples disclosed herein include creating a second model (e.g., an inventory model) of such resource and relationships as deployed. For example, the second model may be an inventory model including the resources and relationships of a deployment in an infrastructure.

Examples disclosed herein provide a user (e.g., a data center administrator or a cloud administrator) with the ability to take corrective actions and maintain blueprint deployments in-sync if the first model of the blueprint differs from the second model of the infrastructure (e.g., whether there is a drift).

Examples disclosed herein provide drift detection ability for deployments to detect a drift associated with a resource in which alterations (e.g., infrastructure changes, resource changes, configuration changes, etc.) have been made outside of a cloud-based provisioning service (e.g., VMware Cloud Assembly). Once drift detection of a resource is complete, examples disclosed herein include generating a report showing the result of the drift detection. For example, if a resource in a deployment and/or infrastructure is altered, the report includes a representation of the deviation (e.g., drift) from the blueprint. The drift representation may be numeric and/or may be text-based to quantify an amount of different or drift between a blueprint-defined resource and the actual state of that resource in a deployment. Further, the example report may be created and/or otherwise generated for each resource that has deviated, along with information of properties of the resource(s) that do not match the expected values (e.g., the properties set forth in the blueprint). In such an example, a user (e.g., a data center administrator or a cloud administrator) may obtain such a report and take corrective actions on the resource(s) and/or deployment(s). Example corrective actions include synchronizing the resources and/or deployments with blueprint definitions. Such synchronization may involve updating a blueprint to reflect resource states of the actual deployment. Additionally or alternatively, such synchronization may involve updating portions of the deployment to match the blueprint.

In examples disclosed herein, drift detection may be provided at the deployment level or at the individual resource level. In examples disclosed herein, drift detection may be triggered by a user of the deployment or a user of the resource. Further, examples disclosed herein include providing the report and determining whether the resource(s) and/or deployment is to be synchronized back to the original blueprint. For example, a user (e.g., a data center administrator or a cloud administrator) may choose, in response to obtaining a drift report indicating a drift value, to synchronize the resource(s) and/or deployment with the original blueprint. As such, examples disclosed herein may re-apply the blueprint to the resource(s) and/or deployment. Additionally or alternatively, the blueprint may be updated to match the resource(s) and/or deployment.

Examples disclosed herein to detect drift in a hybrid cloud environment may be implemented using a configuration model determiner to, after deployment of a blueprint in a hybrid cloud environment, generate a first model including first relationships of a first plurality of resources corresponding to the blueprint, the blueprint including a plurality of properties in which at least one of the plurality of properties is agnostic of type, an inventory model determiner to generate a second model including second relationships of a second plurality of resources as deployed in the hybrid cloud environment based on the blueprint, and a drift determiner to determine a drift value based on the first relationships and the second relationships, the drift value representative of a difference between the first relationships and the second relationships.

FIG. 1 illustrates an example hybrid cloud environment 100 including an example drift detector 102. The hybrid cloud environment 100 of FIG. 1 includes an example user interface 104, an example blueprint 106, an example blueprint database 108, an example deployment interface 110, an example provisioner 112, an example mapping database 114, an example cloud provider 116, an example private cloud 118, an example hybrid cloud 120, and an example public cloud 122.

In the example illustrated in FIG. 1, the example drift detector 102 communicates with the user interface 104 to obtain any of an example drift indication 124 and/or the blueprint 106. In response to obtaining the drift indication 124 from the user interface 104, the drift detector 102 is operable to generate an example blueprint model 126 (e.g., a configuration model) and an example inventory model 128, in examples disclosed herein, the blueprint model 126 is a baseline blueprint model representative of resource(s) to be selected for deployment of the blueprint 106. Additionally, in examples disclosed herein, the inventory model 128 is represented as a model of the state of resources(s) currently running in the deployment when the inventory model 128 is generated.

In the example of FIG. 1, blueprint model 126 is an undirected graph representative of a single resource and/or plurality of resources, along with corresponding relationships among such resource(s). The example inventory model 128 is an undirected graph representative of a single resource and/or plurality of resources corresponding to the resource(s) and/or relationships in the blueprint model 126 as deployed in any of the private cloud 118, the hybrid cloud 120, and/or the public cloud 122. In other examples disclosed herein, any of the blueprint model 126 (e.g., the configuration model) and/or the inventory model 128 may be created in any suitable form other than an undirected graph (e.g., a matrix, a dependency tree, and/or any suitable data structure). Furthermore, the drift detector 102 is operable to generate an example drift report 130 representative of a drift value associated with the single and/or plurality of resources previously modeled (e.g., the resource(s) modeled in the blueprint model 126 and/or the inventory model 128). The operation of the drift detector 102 is explained in further detail below.

In the example illustrated in FIG. 1, the user interface 104 receives input from a user such as, for example, a decision to generate the drift indication 124 and/or parameters to provide the blueprint 106 to the blueprint database 108. In such an example, the user of the user interface 104 provides the blueprint 106 to be transmitted to the blueprint database 108. In examples disclosed herein, the user interface 104 may be implemented by a touchscreen, a keyboard, graphical user interface (GUI), etc. However, any other type of user interface device(s) may additionally or alternatively be used. For example, the example user interface 104 may be implemented by an audio microphone, light emitting diodes, a mouse, a button, etc.

In FIG. 1, the example blueprint 106 is a cloud-agnostic blueprint created, selected, and/or otherwise initiated by a user of the user interface 104. For example, the relationships included in the blueprint 106 may specify the desired cloud computing resource(s) and/or constraints to be provisioned on any of the private cloud 118, the hybrid cloud 120, and/or the public cloud 122. The blueprint 106 includes interconnected components (e.g., resource(s) that include relationship(s)) to be deployed on any of the private cloud 118, the hybrid cloud 120, and/or the public cloud 122. In one example, a user may initiate the blueprint 106 as a standard blueprint including an image specific to an Amazon Web Services (AWS) cloud. Alternatively, a user may initiate the blueprint 106 as a cloud-agnostic blueprint. In any example, the blueprint 106 may be stored in the blueprint database 108.

The example blueprint database 108 of the illustrated example of FIG. 1 may be implemented by any device for storing data such as, for example, cloud memory, flash memory, magnetic media, optical media, etc. Furthermore, the data stored in the example blueprint database 108 may be in any data format such as, for example, binary data, comma delimited data, tab delimited data, structured query language (SQL) structures, etc. In FIG. 1, the blueprint database 108 operates to store the blueprint 106 provided from the user interface 104. In some examples disclosed herein, the blueprint database 108 may generalize the blueprint 106 to store the blueprint 106 as a cloud-agnostic blueprint. For example, the blueprint database 108 may store a generalized blueprint. In other examples disclosed herein, the blueprint database 108 may store the blueprint 106 and organize properties that may be included in the blueprint 106.

In the example of FIG. 1, the deployment interface 110 is implemented using an example container. Alternatively, in other examples, numerous containers that run on a single computer, processor system and/or in the hybrid cloud environment 100 may be used to implement the deployment interface 110. The deployment interface 110 is configured to obtain the blueprint 106 from the blueprint database 108. Since the blueprint 106 may be a cloud-agnostic blueprint, the deployment interface 110 may communicate with the provisioner 112 to provide and/or otherwise insert cloud-specific constraints in the blueprint 106. For example, the example provisioner 112 may be utilized with the deployment interface 110 to determine specific properties for use in the blueprint 106. Each generalized property and corresponding specific property pair may be stored in the mappings database 114.

The example mappings database 114 of the illustrated example of FIG. 1 may be implemented by any device for storing data such as, for example, cloud memory, flash memory, magnetic media, optical media, etc. Furthermore, the data stored in the example mappings database 114 may be in any data format such as, for example, binary data, comma delimited data, tab delimited data, structured query language (SQL) structures, etc. In FIG. 1, the mappings database 114 operates to store the mappings which indicate a generalized property in the blueprint 106 and the corresponding specific property determined by the deployment interface 110.

The example cloud provider 116 of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 1, the cloud provider 116 is configured to deploy and/or otherwise provision the blueprint 106 onto any of the private cloud 118, the hybrid cloud 120, and/or the public cloud 122. In examples disclosed herein, the cloud provider 116 includes an example deployment 132 in which the deployment interface 110 may retrieve. The deployment 132 represents the configuration of the blueprint 106 as deployed on any of the private cloud 118, hybrid cloud 120, and/or public cloud 122.

In the example of FIG. 1, the private cloud 118 is an endpoint and/or a service on which a user can provision resources. The private cloud 118 is hosted by a private cloud computing platform such as VMware vSphere™, Microsoft Hyper-V™, etc. For example, the private cloud 118 may be an endpoint that provides a specific function or feature of a service. The private cloud 118 may have multiple endpoints. In the example of FIG. 1, the private cloud 118 is implemented in a cloud-agnostic system (e.g., the hybrid cloud environment 100 is a cloud-agnostic hybrid cloud environment 100). Alternatively, in other examples disclosed herein, the private cloud 118 may be implemented in a non-agnostic system.

In the example of FIG. 1, the hybrid cloud 120 is an endpoint and/or a service on which a user can provision resources. The hybrid cloud 120 is implemented in response to the blueprint 106 including constraints and/or resources to be implemented using a private cloud (e.g., the private cloud 118) and/or a native cloud. For example, hybrid cloud 120 may be an endpoint that can deploy a VMware-based application that uses an AWS service. The hybrid cloud 120 may have multiple endpoints. In the example of FIG. 1, the hybrid cloud 120 is implemented in a cloud-agnostic system (e.g., the hybrid cloud environment 100 is cloud-agnostic hybrid cloud environment 100). Alternatively, in other examples disclosed herein, the hybrid cloud 120 may be implemented in a cloud-non-agnostic system.

In the example of FIG. 1, the public cloud 122 is an endpoint and/or a service on which a user can provision resources. The public cloud 122 may be used to implement a public cloud service such as Amazon Web Services (AWS). In the example of FIG. 1, the public cloud 122 is implemented in a cloud-agnostic system (e.g., the hybrid cloud environment 100 is a cloud-agnostic hybrid cloud environment 100). Alternatively, in other examples disclosed herein, the public cloud 122 may be implemented in a cloud-non-agnostic system. In examples disclosed herein, a cloud-non-agnostic system may refer to a cloud-based provision system in which the cloud resource and/or cloud resources to be provisioned are known before provisioning is instantiated. For example, in a cloud-non-agnostic system, a user may have knowledge of a specific cloud resource that is to be provisioned and, as such, include specific cloud constraints in a corresponding blueprint.

Figure 2:
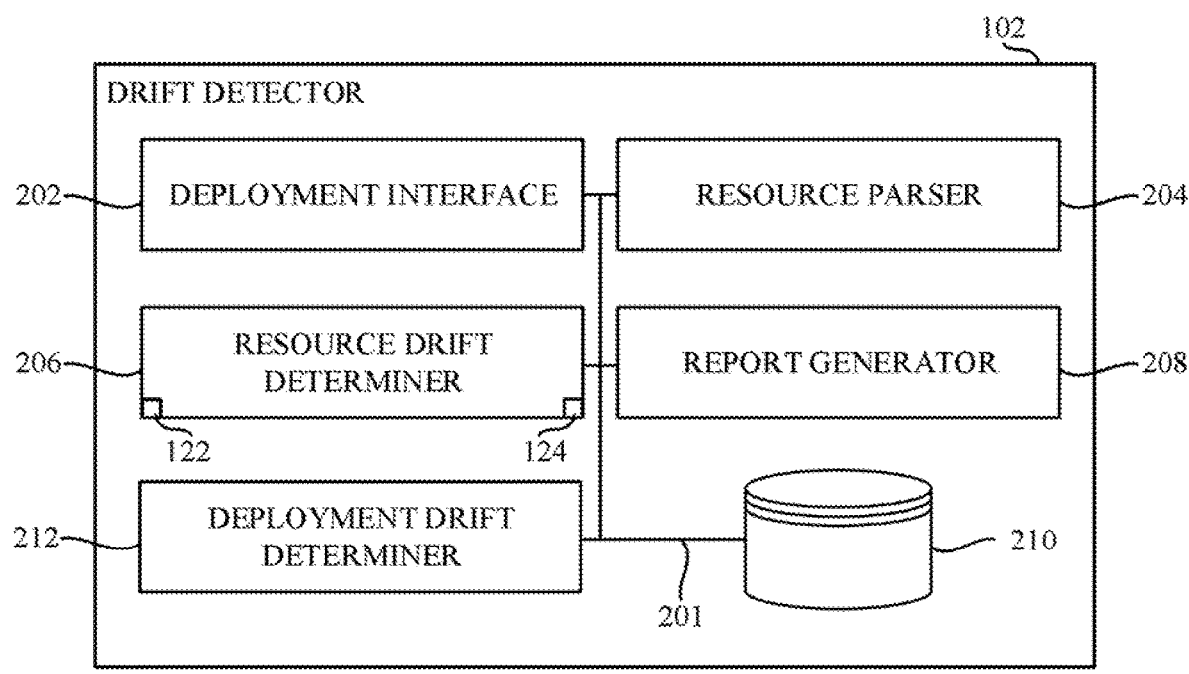
FIG. 2 illustrates the example drift detector of FIG. 1, to determine a drift associated with the cloud-based system of FIG. 1.

FIG. 2 illustrates the example drift detector 102 of FIG. 1, to determine a drift value associated with the hybrid cloud environment 100 of FIG. 1. The drift detector 102 of FIG. 2 includes an example deployment interface 202, an example resource parser 204, an example resource drift determiner 206, an example report generator 208, and example report database 210, and an example deployment drift determiner 212. In FIG. 2, any of the deployment interface 202, the resource parser 204, the resource drift determiner 206, the report generator 208, the report database 210, and/or the deployment drift determiner 212 may communicate via an example communication bus 201. In examples disclosed herein, the communication bus 201.

In the example illustrated in FIG. 2, the deployment interface 202 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD)(s)), field programmable logic device(s) (FPLD(s)), digital signal processor(s) (DSP(s)), etc. The deployment interface 202 is configured to determine whether the deployment 132 is available (e.g., whether the blueprint 106 is deployed on any of the private cloud 118, the hybrid cloud 120, and/or the public cloud 122 of FIG. 1). In examples disclosed herein, if the deployment interface 202 determines that a deployment 132 is available, then the deployment interface 202 transmits, via the communication bus 201 to the resource parser 204, an indication illustrating that the deployment 132 is available. For example, the deployment interface 202 may communicate via the cloud provider 116 to determine whether resource(s) have been provisioned on any of the private cloud 118, the hybrid cloud 120, and/or the public cloud 122 of FIG. 1. If the deployment interface 202 determines that the deployment 132 is available, then the deployment interface 202 obtains, through the cloud provider 116, the deployment 132 and any resources deployed on any of the private cloud 118, the hybrid cloud 120, and/or the public cloud 122. The obtained deployment 132 and/or resource(s) deployed is sent to the resource parser 204.

In addition, the deployment interface 202 is configured to communicate with the user interface 104 of FIG. 1 to determine and/or otherwise obtain the drift indication 124. If the deployment interface 202 determines and/or otherwise obtains the drift indication 124, then the deployment interface 202 transmits a corresponding indication of the drift indication 124 to the resource parser 204 via the communication bus. In some examples disclosed herein, a single indication may be sent for each resource to be analyzed that is identified in the drift indication 124. Additionally or alternatively, a cumulative indication may be sent to identify the resource(s) to be analyzed that is/are identified in the drift indication 124.

The example resource parser 204 of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The resource parser 204 of FIG. 2 is configured to obtain the indications from the deployment interface 202 (e.g., the indication of whether the deployment 132 is available and/or the indication of whether the drift indication 124 is available). In response to both indications (e.g., the indication of whether the deployment 132 is available and the indication of whether the drift indication 124 is available), the resource parser 204 parses the resource(s) contained in the blueprint 106 and in the deployment. After parsing the resource(s) contained in the blueprint 106, the resource parser 204 then identifies the corresponding resource, as deployed, in the deployment 132. After parsing and identifying an individual resource in the blueprint 106, and identifying the corresponding resource as deployed in the deployment 132, the resource parser 204 then determines whether an additional resource is available. If an additional resource is available, then the resource parser 204 parses the additional resource contained in the blueprint 106 and the corresponding resource, as deployed, in the deployment 132. In examples disclosed herein, the resource parser 204 transmits the parsed resource(s) to the resource drift determiner 206 via the communication bus 201.

The example resource drift determiner 206 of FIG. 2 is implemented by a logic circuit such as, for example, a hardware processor. However, any other type of circuitry may additionally or alternatively be used such as, for example, one or more analog, or digital circuit(s), logic circuits, programmable processor(s), application specific integrated circuit(s) (AS IC(s)), programmable logic device(s) (PLD(s)), field programmable logic device(s) (FPLD(s)), digital signal processor(s) (DSP(s)), etc. The resource drift determiner 206 determines the drill of the identified resource(s). In examples disclosed herein, the resource drift determiner 206 determines the blueprint model 125 of FIG. 1 for the identified resource based on the identified resource and the corresponding relationships as included in the blueprint 106. In examples disclosed herein, the resource drift determiner 206 determines the blueprint model 126 based on Equation 1 below.

$$C=(V_c, E_c) \quad \text{Equation 1}$$

In Equation 1 above, the variable C represents the blueprint model 126, the variable $V_C$ represents a set of vertices of resources in the blueprint 106, and the variable $E_C$ represents a set of edges of the relationships between the resources in the blueprint 106. In addition, the example drift determiner 206 determines the inventory model 128 for the identified resource based on the identified resource and the corresponding relationships as included in the deployment 132 based on Equation 2 below.

$$I=(V_i, E_i) \quad \text{Equation 2}$$

In Equation 2 above, the variable I represents the inventory model 128, the variable $V_i$ represents a set of vertices of resources in the deployment 132, and the variable $E_i$ represents a set of edges of the relationships between the resources in the deployment 132. Once the blueprint model 126 and the inventory model 128 are generated based on the resource vertices ($V_i$) and the resource edges in the deployment ($E_i$), the resource drift determiner 206 determines the drift of the resource. The resource drift determiner 206 determines the drift of the resource based on Equation 3 below.

$$D_r = \text{diffNode}(V_c, V_i) + |\text{degree}(E_c) - \text{degree}(E_i)| \quad \text{Equation 3}$$

In Equation 3 above, the variable $D_r$ represents the drift of the resource, the function "diffNode" compares the properties of the vertices, and the absolute value of "degree($E_c$)−degree($E_i$)" returns in the change in the number of relationships for each vertex. In examples disclosed herein, degree represents a numerical value proportional to and/or otherwise equal to the number of other resources interacting with a specified edge. In Equation 3, the drift of a resource ($D_r$) is equal to a numeric difference between resource vertices in a blueprint ($V_c$) and resource vertices in a deployment ($V_i$) plus the absolute difference between the number of resources affected by and/or otherwise communicating with resource edges in the blueprint ($E_c$) from the number of resources affected by and/or otherwise communicating with resource edges in a deployment ($E_i$).

In other examples disclosed herein, the resource drift determiner 206 may determine a plurality of blueprint models 126 for each individual resource or, the resource drift determiner 206 may determine a single blueprint model 126 for all the identified resources, combined.

In the example of FIG. 2, the report generator 208 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The report generator 208 communicates with the resource drift determiner 206 to obtain the drift of the resource ($D_r$). In response, the report generator 208 determines whether the resource in the blueprint 106 substantially matches or is synchronized (e.g., in sync) with the resource in the deployment 132. For example, if the drift of the resource ($D_r$) is greater than a drift threshold, then the report generator 208 determines the resource does not substantially match or is not in sync with the blueprint 106 and, as such, generates a report (e.g., the drift report 130) indicating the drift of the resource ($D_r$). Alternatively in yet another example, if the drift of the resource ($D_r$) is less than a drift threshold, then the report generator 208 determines the resource substantially matches or is in sync with the blueprint 106 and, as such, generates a report (e.g., the drift report 130) indicating the resource substantially matches or is in sync with the blueprint 106. In examples disclosed herein, the report generator 208 may transmit the drift report 130 to the deployment interface 202 to be sent to the user interface 104 of FIG. 1. Alternatively, the report generator 208 may transmit the drift report 130 directly to the user interface 104 of FIG. 1. The drift report 130 generated by the report generator 208 is also sent to the report database 210 to be stored.

In FIG. 2, the example report database 210 may be implemented by any device for storing data such as, for example, flash memory, magnetic media, optical media, etc. Furthermore, the data stored in the example report database 210 may be in any data format such as, for example, binary data, comma delimited data, tab delimited data, structured query language (SQL) structures, etc. The report database 210 is configured to store the drift report 130 generated by the report generator 208. In some examples disclosed herein, the report database 210 may organize the reports in a manner consistent with user preferences. For example, the report database 210 may organize the reports by file size, file name, etc.

The example deployment drift determiner 212 of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The deployment drift determiner 212 of FIG. 2 is configured to determine an overall drift of the deployment (D). For example, the deployment drift: determiner 212 obtains and/or otherwise receives the resource drifts ($D_r$) stored in the report database 210 to calculate an overall drift of the deployment 132 ($D_d$). In order to determine the drift of the deployment ($D_d$), the deployment drift determiner 212 initially determines whether additional resource drifts ($D_r$) are available. Once all resource drifts ($D_r$) have been collected, the deployment drift determiner 212 determines the drift of the deployment ($D_d$). The deployment drift determiner 212 determines the drift of the deployment ($D_d$) based on Equation 4 below.

$$D_d = \sum_{i=0}^{n} D_{ri} \quad \text{Equation 4}$$

In Equation 4 above, the variable $D_d$ represents the drift of the deployment (e.g., a summed drift value), the variable n represents the total number of resources (e.g., a stopping point), the variable i represents an index of summation starting at 0, and the variable $D_r$ represents the drift of the $i^{th}$ resource. As such, the drift of the deployment ($D_d$) is equal to the sum of the individual resource drifts ($D_r$) for a number of resources (n) in a deployment. The operation of the deployment drift determiner 212 is explained in further detail below.

Figure 3:
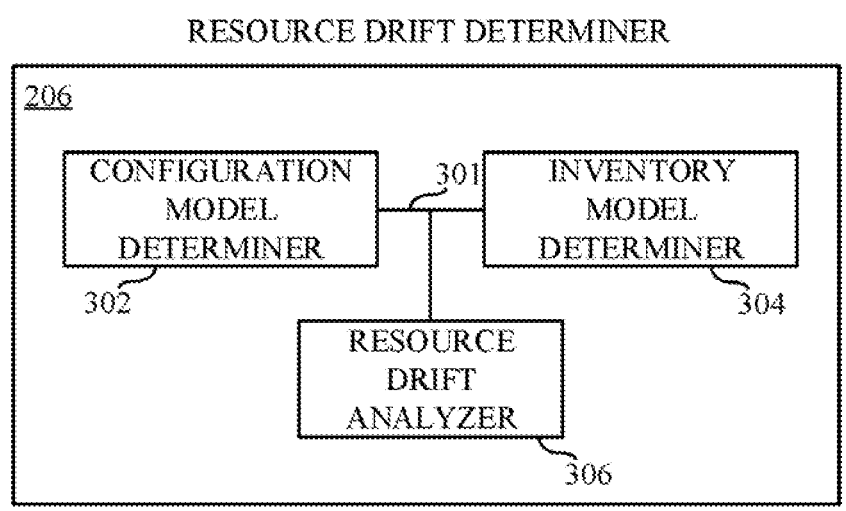
FIG. 3 illustrates the example resource drift determiner of FIG. 2, to determine a drift associated with an individual resource in the hybrid cloud environment of FIG. 1.

FIG. 3 illustrates the example resource drift determiner 206 of FIG. 2, to determine a drift associated with an individual resource in the hybrid cloud environment 100 of FIG. 1. The resource drift determiner 206 includes an example configuration model determiner 302, an example inventory model determiner 304, and an example resource drift analyzer 306. In the example of FIG. 3, any of the configuration model determiner 302, the inventory model determiner 304, and/or the resource drift analyzer 306 may communicate via an example communication bus 301.

The example configuration model determiner 302 of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The configuration model determiner 302 is configured to communicate with the resource parser 204 of FIG. 2 to obtain an identified resource. In examples disclosed herein, configuration model determiner 302 determines the blueprint model 126 of FIG. 1 for the identified resource based on the identified resource and the corresponding relationships as included in the blueprint 106. In examples disclosed herein, the configuration model determiner 302 determines the blueprint model 126 based on Equation 1 above.

The example inventory model determiner 304 of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The inventory model determiner 304 is configured to communicate with the resource parser 204 of FIG. 2 to obtain an identified resource. In examples disclosed herein, the inventory model determiner 304 determines the inventory model 128 of FIG. 1 for the identified resource based on the identified resource and the corresponding relationships as included in the deployment 132. In examples disclosed herein, the inventory model determiner 304 determines the inventory model 128 based on Equation 2 above.

The example resource drift analyzer 306 of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. Once the blueprint model 126 and the inventory model 128 are generated, the resource drift analyzer 306 determines the drift of the resource ($D_r$). The resource drift analyzer 306 determines the drift of the resource ($D_r$) based on Equation 3 above.

Figure 4:
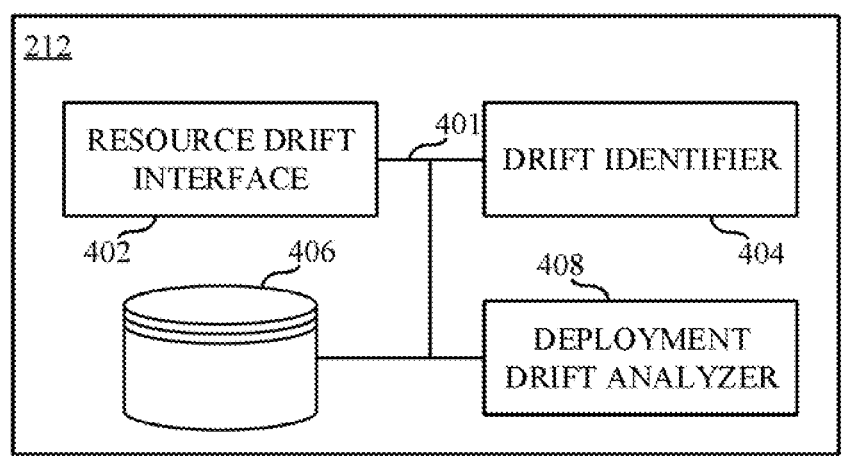
FIG. 4 illustrates the example deployment drift determiner of FIG. 2, to determine a drift associated with the deployment in the hybrid cloud environment of FIG. 1.

FIG. 4 illustrates the example deployment drift determiner 212 of FIG. 2, to determine a drift associated with the deployment 132 in the hybrid cloud environment 100 of FIG. 1. The deployment drift determiner 212 includes an example resource drift interface 402, an example drift identifier 404, an example drift database 406, and an example deployment drift analyzer 408. In FIG. 4, any of the resource drift interface 402, the drift identifier 404, the drift database 406, and/or the deployment drift analyzer 408 may communicate via an example communication bus 401.

The example resource drift interface 402 of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The resource drift interface 402 of FIG. 4 communicates with either the resource drift analyzer 306 of FIG. 3 and/or the report generator 208 of FIG. 2 to determine whether a new resource drift is available (e.g., determines whether a drift has been generated for a resource that is included in the blueprint 106). In response to determining that a resource drift (e.g., a drift of a resource ($D_r$)) is available, the resource drift interface 402 communicates such a resource drift (e.g., a drift of a resource ($D_r$)) to the drift identifier 404 via the communication bus 401. Alternatively, if the resource drift interface 402 determines that a resource drift (e.g., a drift of a resource ($D_r$)) is not available, then the resource drift interface 402 communicates with the deployment drift analyzer 408 that no new resource drifts are available. For example, if the blueprint 106 of FIG. 1 includes two resources, after iterating and determining the resource drift associated with the two resources is available (e.g., a first drift of a first resource ($D_{rs}$) and a second drift of a second resource ($D_{r2}$)), the resource drift interface 402 may communicate with the deployment drift analyzer 408 that no more resource drifts are available. Such an example may correspond to identifying all resource drifts in the blueprint 106 and/or deployment 132. In yet another example, if there are zero resources in the blueprint 106, then the resource drift interface 402 may determine that no resource drifts are available and communicate to the deployment drift analyzer 408 that no resource drifts are available.

The example drift identifier 404 of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The drift identifier 404 communicates with the resource drift interface 402 to obtain and/or otherwise receive the resource drifts (e.g., a drift of a resource ($D_r$)) that have been identified. In response, the drift identifier 404 parses the resource drift ($D_r$) and stores the resource drift ($D_r$) into the drift database 406.

In FIG. 4, the example drift database 406 may be implemented by any device for storing data such as, for example, flash memory, magnetic media, optical media, etc. Furthermore, the data stored in the example drift database 406 may be in any data format such as, for example, binary data, comma delimited data, tab delimited data, structured query language (SQL) structures, etc. The drift database 406 is configured to store the resource drifts ($D_r$) parsed by the drift identifier 404. In some examples disclosed herein, the drift database 406 may organize the resource drifts ($D_r$) in a manner consistent with user preference. For example, the drift database 406 may organize the resource drifts ($D_r$) by file size, tile name, etc.

The example deployment drift analyzer 408 of FIG. 4 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The deployment drift analyzer 408 is configured to determine whether to determine the drift of the deployment ($D_d$). In examples disclosed herein, the drift of the deployment ($D_d$) is representative of an overall drift of all the individual resources. For example, if the deployment drift analyzer 408 determines to identify the drift of the deployment ($D_d$), then the deployment drift analyzer 408 may access the resource drifts ($D_r$) stored in the drift database 406. Further in such an example, the deployment drift analyzer 408 may execute the operations of Equation 4 to determine the drift of the deployment ($D_d$).

FIG. 5 is example pseudocode 500 representative of machine readable instructions that may be executed to implement the blueprint 106 of FIG. 1. The example of FIG. 5 includes example lines of code (LOCs) 501, 502, 503, 504, 505, 506, 508, 510, 511, 512, 513, and 514. In the example pseudocode 500 of FIG. 5, example LOC 501 represents the version of the blueprint 106 and example LOC 502 represents the inputs. In LOC 501, the inputs are generalized (e.g., not included in the blueprint 106) because the hybrid cloud environment 100 of FIG. 1 is cloud-agnostic. As such, in examples disclosed herein, the generalized inputs (e.g., not included in the blueprint 106) may be entered in during deployment. In addition, example LOC 503 defines two resources, Cloud_Machine_1 (e.g., LOC 504) and example Cloud_Volume_1 (e.g., LOC 511 and referred to in LOC 510).

In the example pseudocode 500 of FIG. 5, LOC 505 represent the device type of the resource defined in LOC 504. LOC 512 represents the device type of the resource defined in LOC 511. Both device types illustrated in LOCs 505 and 511 are cloud-agnostic. In addition, LOCs 506 and 513 are the property headings of the resources defined in LOCs 504 and 511, respectively. LOCs 508-510 are general (e.g., not yet defined). LOC 507 is a defined property specifying the operating system. Likewise, LOC 514 is a defined property specifying the capacity.

Figure 6:
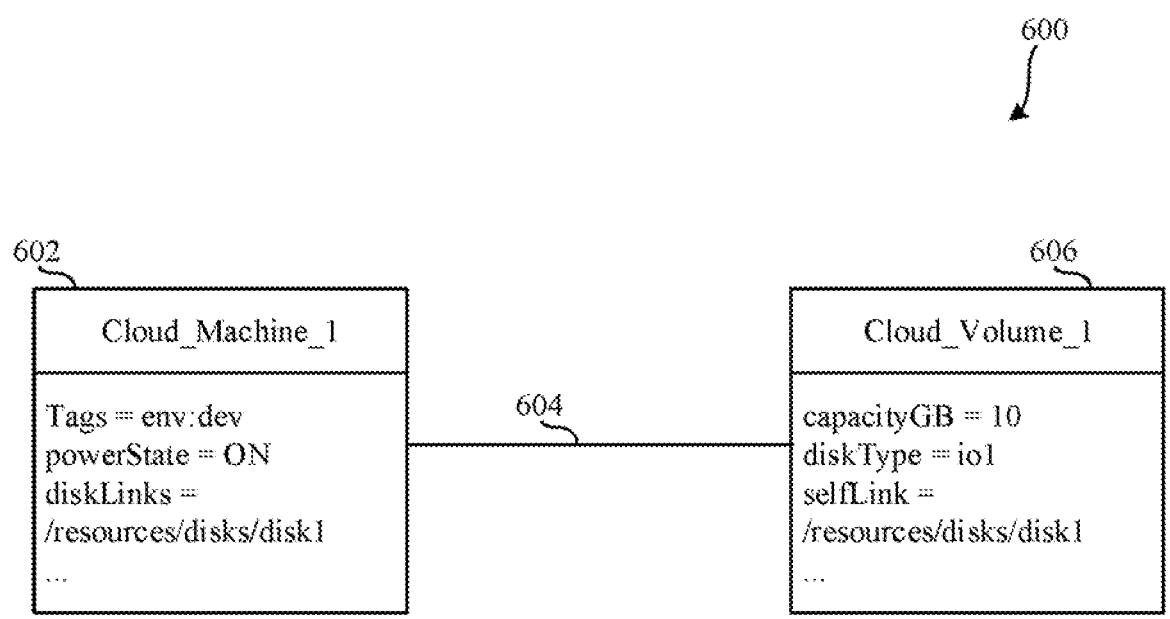
FIG. 6 is an example model representing a resource included in the blueprint of FIG. 1 as selected in the deployment.

FIG. 6 is an example model 600 representing a resource included in the blueprint 106 of FIG. 1 as selected in the deployment 132. The example model 600 of FIG. 6 is an example blueprint model 126 of FIG. 1 that has been analyzed by the deployment interface 110 of FIG. 1. The model 600 includes an example first resource 602, an example first relationship 604, and an example second resource 606. The first resource 602 is Cloud_Machine_1. The second resource 606 is Cloud_Volume_1.

In FIG. 6, the first resource 602 represents an identified resource in the blueprint 106 of FIG. 1. For example, the model 600 represents the relationships and corresponding resources in which the first resource 602 is connected. In another example disclosed herein, an additional model may be made for the second resource 606.

In the example of FIG. 6, the model 600 includes cloud-agnostic profile mappings of the properties included in the first resource 602 and/or the second resource 606. The model 600 represents the expected state in which the cloud-agnostic profile mappings are resolved and populated as node properties. Such an generalization enables the drift detector 102 of FIG. 1 to handle a cloud-agnostic blueprint.

Figure 7:
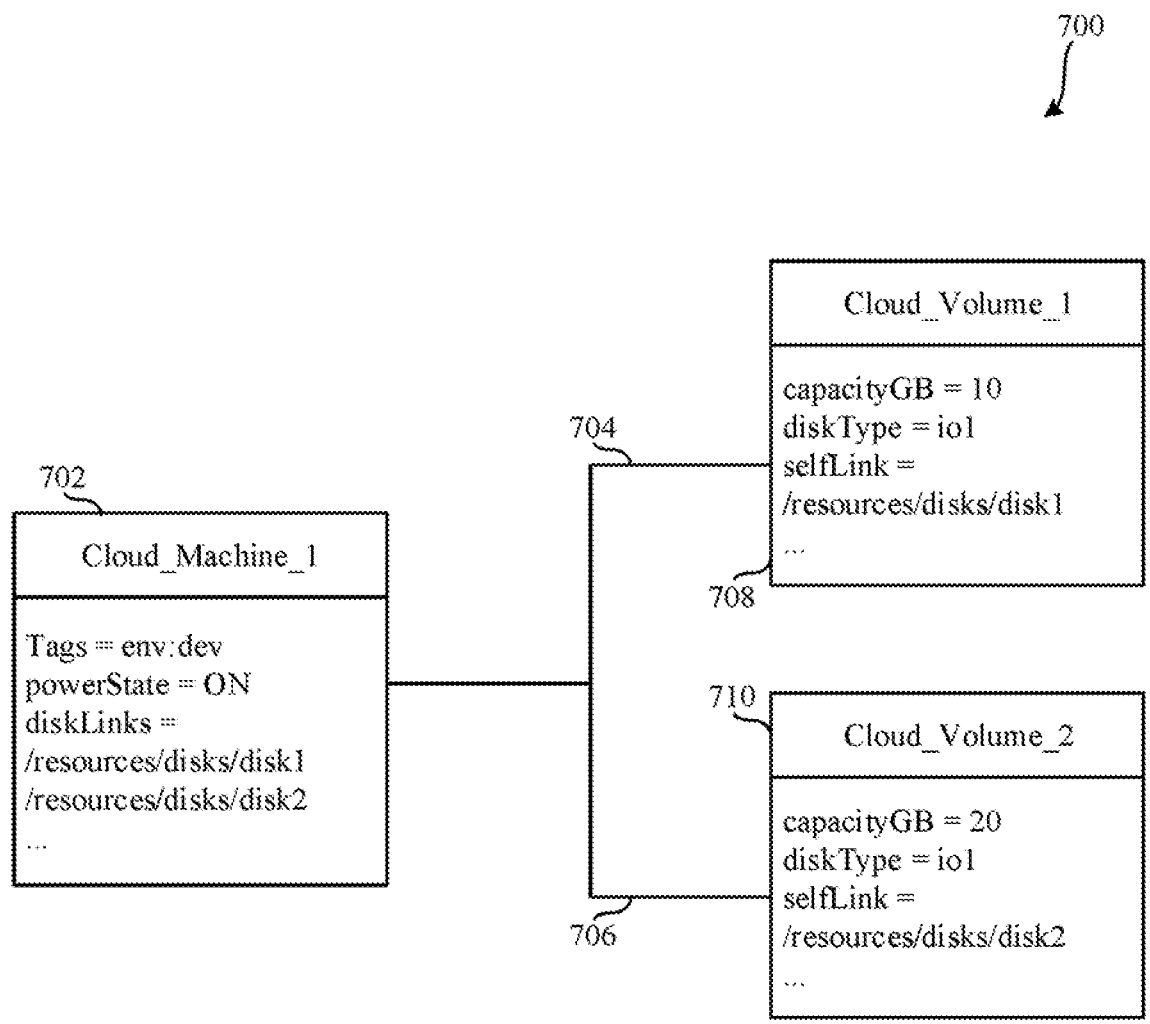
FIG. 7 is an example model representing a resource included in the deployment of FIG. 1.

FIG. 7 is an example model 700 representing a resource included in the deployment 132 of FIG. 1. The example model 700 of FIG. 7 is an example inventory model 128 of FIG. 1. The model 700 includes an example first resource 702, an example first relationship 704, an example second relationship 706, an example second resource 708, and an example third resource 710. The first resource 702 is Cloud_Machine_1. The second resource 708 is Cloud_Volume_1. The third resource 710 is Cloud_Volume_2.

In FIG. 7, the first resource 702 represents the identified resource in the blueprint 106 of FIG. 1, as implemented in the deployment 132. For example, the model 700 represents the relationships and corresponding resources that the first resource 702 is connected to in the deployment 132. In another example disclosed herein, an additional model may be made for the second resource 708 and/or the third resource 710.

The inventory of cloud endpoints (e.g., the private cloud 118, the hybrid cloud 120, and/or the public cloud 122) can be collected frequently (e.g., every ten minutes) to reconcile the real state with the inventory of the deployment. At every frequency (e.g., every ten minutes), all the relevant resources and their properties are queried via the cloud provider 116 of FIG. 1 and the model 700 of the deployment 132 is updated with latest state.

While an example manner of implementing the drift detector 102 of FIG. 1 is illustrated in FIGS. 2, 3, and/or 4, one or more of the elements, processes and/or devices illustrated in FIGS. 2, 3, and/or 4 may be combined, divided, re-arranged, omitted, eliminated and/or implemented in any other way. Further, the example deployment interface 202, the example resource parser 204, the example resource drift determiner 206, the example report generator 206, the example report database 210, the example deployment drift determiner 212, and/or, more generally, the example drift detector 102 of FIG. 1, the example configuration model determiner 302, the example inventory model determiner 304, the example resource drift analyzer 306, and/or, more generally, the example resource drift determiner 206 of FIGS. 2 and/or 3, the example resource drift interface 402, the example drift identifier 404, the example drift database 406, the example deployment drift analyzer 408, and/or, more generally, the example deployment drift determiner 212 of FIGS. 2 and/or 4 may be implemented by hardware, software, firmware and/or any combination of hardware, software and/or firmware. Thus, for example, any of the example deployment interface 202, the example resource parser 204, the example resource drift determiner 206, the example report generator 208, the example report database 210, the example deployment drift determiner 212, and/or, more generally, the example drift detector 102 of FIG. 1, the example configuration model determiner 302, the example inventory model determiner 304, the example resource drift analyzer 306, and/or, more generally, the example resource drift determiner 206 of FIGS. 2 and/or 3, the example resource drift interface 402, the example drift identifier 404, the example drift database 406, the example deployment drift analyzer 408, and/or, more generally, the example deployment drift determiner 212 of FIGS. 2 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example deployment interface 202, the example resource parser 204, the example resource drift determiner 206, the example report generator 208, the example report database 210, the example deployment drift determiner 212, and/or, more generally, the example drift detector 102 of FIG. 1, the example configuration model determiner 302, the example inventory model determiner 304, the example resource drift analyzer 306, and/or, more generally, the example resource drift determiner 206 of FIGS. 2 and/or 3, the example resource drift interface 402, the example drift identifier 404, the example drift database 406, the example deployment drift analyzer 408, and/or, more generally, the example deployment drift determiner 212 of FIGS. 2 and/or 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example drift detector 102 of FIG. 1 may include one or more elements, processes and/or devices in addition to, or instead of, those illustrated in FIGS. 2, 3, and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
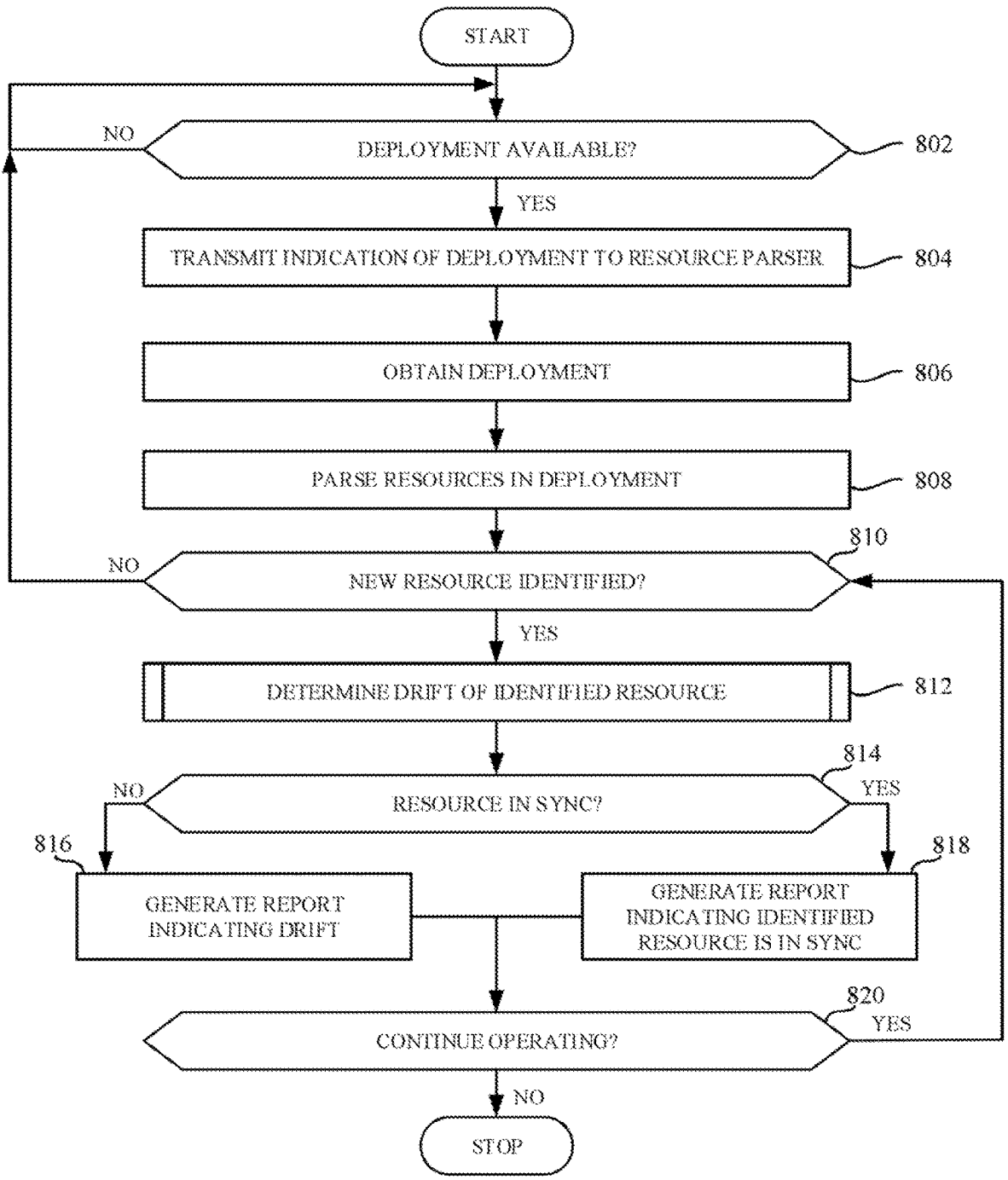
FIG. 8 is a flowchart representative of example machine readable instructions that may be executed to implement the drift detector of FIGS. 1 and/or 2 to determine a drift associated with the hybrid cloud environment of FIG. 1.
Figure 9:
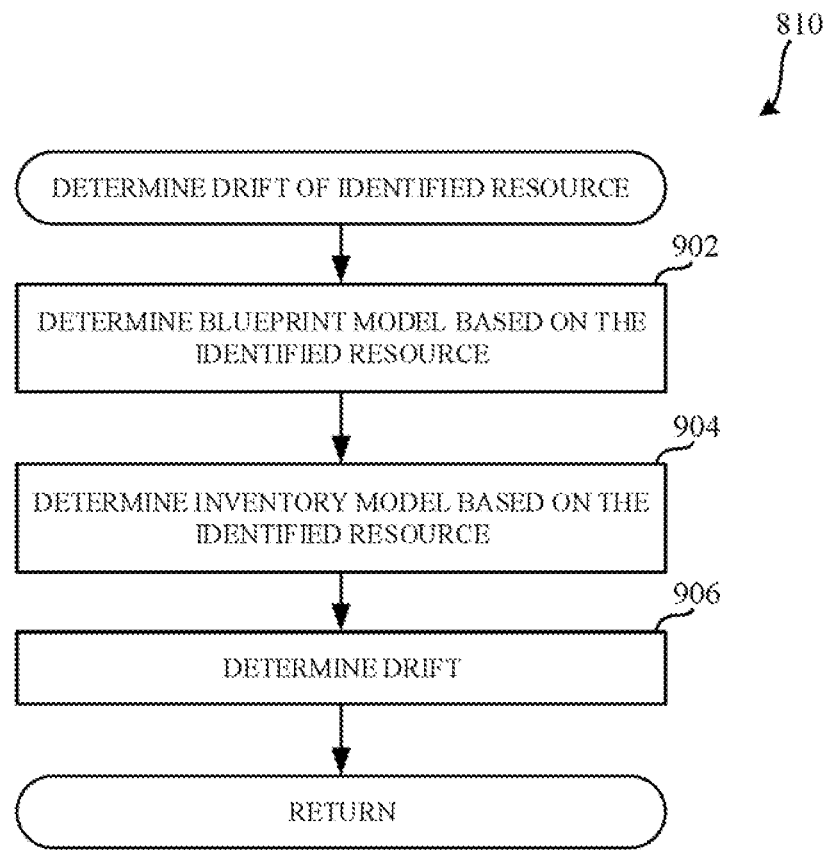
FIG. 9 is a flowchart representative of example machine readable instructions that may be executed to implement the resource drift detector of FIGS. 2 and/or 3 to determine a drift associated with an individual resource in the hybrid cloud environment of FIG. 1.

Flowcharts representative of example hardware logic, machine readable instructions, hardware implemented state machines, and/or any combination thereof for implementing the drift detector 102 of FIG. 1 is shown in FIGS. 8, 9, and/or 10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8, 9, and/or 10, many other methods of implementing the example drift detector 102 may alternatively be used. For example, the order of execution of the blocks may be changed, and/or some of the blocks described may be changed, eliminated, preformed in parallel, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc, in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 8, 9, and/or 10 may be implemented using executable instructions (e.g , computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of: A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions that may be executed to implement the drift detector 102 of FIGS. 1 and/or 2 to determine a drift associated with the hybrid cloud environment 100 of FIG. 1.

In the example illustrated in FIG. 8, the deployment interface 202 (FIG. 2) determines whether the deployment 132 (FIG. 1) is available (e.g., whether the blueprint 106 (FIG. 1) is deployed on any of the private cloud 118 (FIG. 1), the hybrid cloud 120 (FIG. 1), and/or the public cloud 122 (FIG. 1)), (Block 802). If the example deployment interface 202 determines that the deployment 132 is not available (e.g., the control of block 802 returns a result NO), control proceeds to wait. If the example deployment interface 202 determines that the deployment 132 is available (e.g., the control of block 802 returns a result of YES), the example deployment interface 202 transmits, via the communication bus 201 (FIG. 2) to the resource parser 204 (FIG. 2), an indication illustrating that the deployment 132 is available. (Block 804). For example, the deployment interface 202 may communicate via the cloud provider 116 (FIG. 1) to determine whether resource(s) have been provisioned on any of the private cloud 118, the hybrid cloud 120, and/or the public cloud 122 of FIG. 1.

If the example deployment interface 202 determines that the deployment 132 is available, the deployment interface 202 obtains, through the cloud provider 116, the deployment 132 and any resources deployed on any of the private cloud 118, the hybrid cloud 120, and/or the public cloud 122. (Block 806).

The example resource parser 204 of FIG. 2 parses the resources contained in the blueprint 106 and in the deployment. (Block 808). After parsing the resources in the blueprint 106, and identifying the corresponding resource as deployed in the deployment 132, the resource parser 204 then determines whether an additional resource is available. (Block 810). If the example resource parser 204 determines that there are no new resources (e.g., the control of block 810 returns a result NO), control returns to block 802. If a new resource is available (e.g., the control of block 810 returns a result of YES), control proceed to block 812. For example, in response to the resource parser 204 parsing the resources, the resource parser 204 determines, from the parsed resource, whether a new resource is included (e.g., a resource in which the drift has not been analyzed). If so, control proceeds to block 812.

The example resource drift determiner 206 (FIG. 2) determines the drift of the identified resource(s). (Block 812). The execution of the control in block 812 is explained in further detail below.

In the example of FIG. 8, the report generator 208 (FIG. 2) determines whether the resource in the blueprint 106 is in sync with the resource in the deployment. (Block 814) If the example report generator 208 determines the resource is not in sync (e.g., the control of block 814 returns a result of NO), the example report generator 208 generates a report indicating the drift in the resource. (Block 816). Alternatively, if the report generator 208 determines the resource is in sync (e.g., the control of block 814 returns a result of YES), the report generator 208 generates a report indicating the resource is in sync. (Block 818).

The example drift detector 102 of FIGS. 1 and/or 2 determines whether to continue operating. (Block 820). When the drift detector 102 determines to continue operating (e.g., the control of block 820 returns a result of YES), control returns to block 810 in which the resource parser 204 then determines whether an additional resource is available. For example, the drift detector 102 may determine to continue operating if additional resources are identified. Alternatively, if the drift detector 102 determines not to continue operating (e.g., the control of block 820 returns a result of NO), the example process of FIG. 8 stops. The example process of FIG. 8 may stop in the event no more resources are available.

FIG. 9 is a flowchart representative of example machine readable instructions 900 that may be executed to implement the resource drift determiner 206 of FIGS. 2 and/or 3 to determine a drift associated with an individual resource in the hybrid cloud environment 100 of FIG. 1 The example instructions represented by FIG. 9 may be used to implement block 810 of FIG. 8. In the example illustrated in FIG. 9, the configuration model determiner 302 (FIG. 3) determines the example blueprint model 126 of FIG. 1 for the identified resource based on the identified resource and the corresponding relationships as included in the blueprint 106. (Block 902). In examples disclosed herein, the configuration model determiner 302 determines the blueprint model 126 based on Equation 1 above.

The example inventory model determiner 304 of FIG. 3 determines the inventory model 128 of FIG. 1 for the identified resource based on the identified resource and the corresponding relationships as included in the deployment. (Block 904). In examples disclosed herein, the inventory model determiner 304 determines the inventory model 128 based on Equation 2 above.

The example resource drift analyzer 306 (FIG. 3) determines the drift of the resource. (Block 906). The resource drift analyzer 306 determines the drift of the resource based on Equation 3 above.

Figure 10:
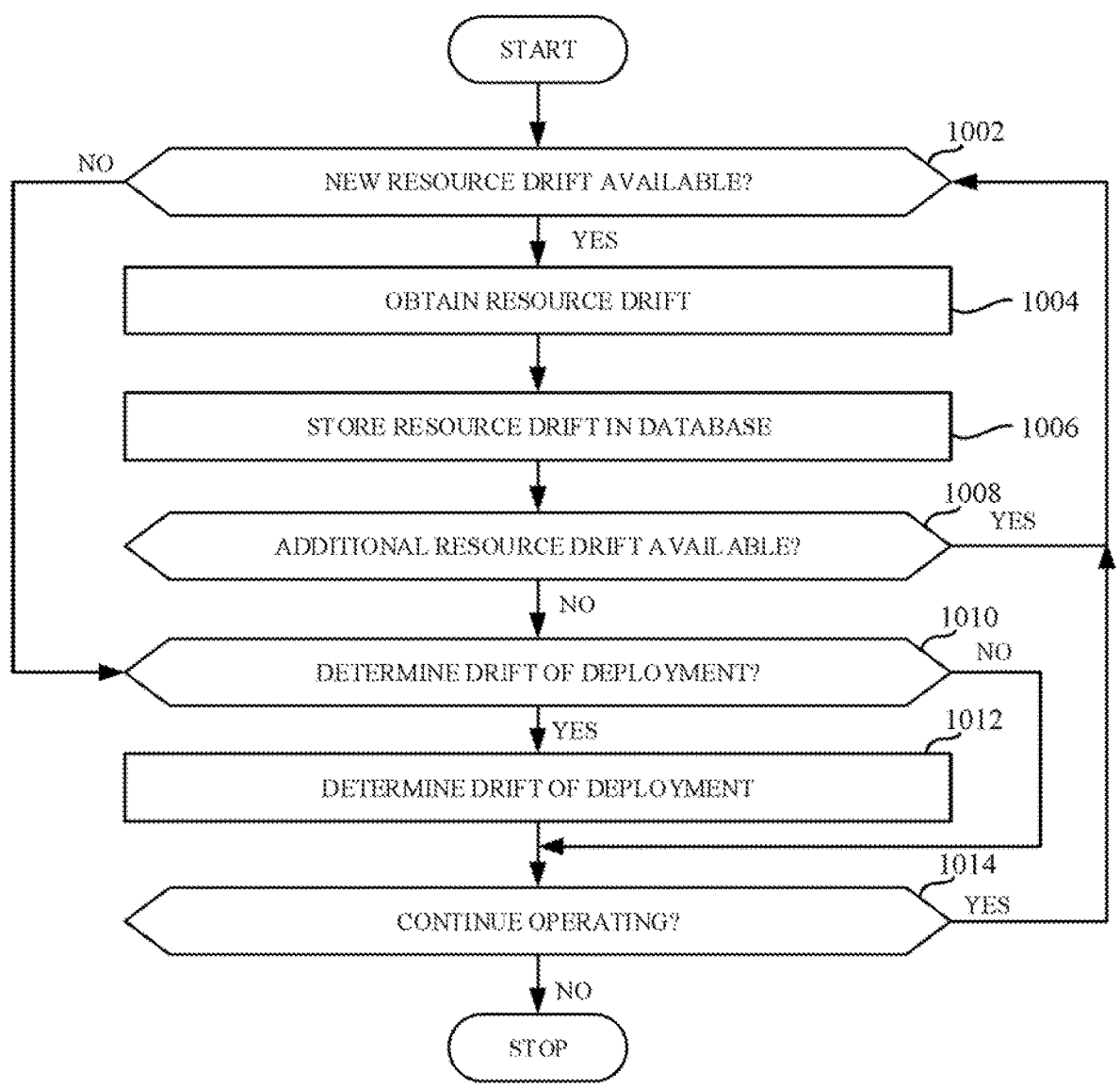
FIG. 10 is a flowchart representative of example machine readable instructions that may be executed to implement the deployment drift detector of FIGS. 2 and/or 4 to determine a drift associated with the deployment in the hybrid cloud environment of FIG. 1.

FIG. 10 is a flowchart representative of example machine readable instructions that may be executed to implement the deployment drift determiner 212 of FIGS. 2 and/or 4 to determine a drift associated with the deployment 132 in the hybrid cloud environment 100 of FIG. 1. The example resource drift interface 402 (FIG. 4) determines whether a new resource drift is available (e.g., determines whether a drift has been generated for a resource that is included in the blueprint 106). (Block 1002). If the resource drift interface 402 determines that a new resource drift is not available (e.g., the control of block 1002 returns a result of NO), control proceeds to block 1010. In response to determining that a resource drift is available (e.g., the control of block 1002 returns a result of YES), the drift identifier 404 (FIG. 4) obtains and/or otherwise receives the resource drifts that have been identified. (Block 1004). In response, the drift identifier 404 parses the resource drift (e.g., $D_r$) and stores the resource drift into the drift database 406 (FIG. 4). (Block 1006). In addition, the example drift identifier 404 determines whether additional resource drifts are available. (Block 1008). If the example drift identifier 404 determines an additional resource drift is available (e.g., the control of block 1008 returns a result of YES), the control returns to block 1002. Alternatively, if the drift identifier 404 determines no additional resource drift is available (e.g., the control of block 1008 returns a result of NO), control proceeds to block 1010.

In the example of FIG. 10, the deployment drift analyzer 408 (FIG. 4) determines whether to determine the drift of the deployment. (Block 1010). If the example deployment drift analyzer 408 determines to identify the drift of the deployment 132 (e.g., the control of block 1010 returns a result of YES), the deployment drift analyzer 408 may access the drifts stored in the drift database 406 and execute the operations of Equation 4 above to determine the drift of the deployment. (Block 1012). Alternatively, if the example deployment drift analyzer 408 determines not to identify the drill of the deployment 132 (e.g., the control of block 1012 returns a result of NO), control proceeds to block 1014.

The example deployment drift determiner 212 of FIGS. 2 and/or 4 determines whether to continue operating. (Block 1014). When the deployment drift determiner 212 determines to continue operating (e.g., the control of block 1014 returns a result of YES), control returns to block 1002 in which the resource drift interface 402 determines whether a new resource drill is available. For example, the deployment drift determiner 212 may determine to continue operating when a new deployment drift is to be detected. Alternatively, if the deployment drift determiner 212 determines not to continue operating (e.g., the control of block 1014 returns a result of NO), the example process of FIG. 10 stops. The example process of FIG. 10 may stop in the event the deployment 132 becomes unavailable, etc.

Figure 11:
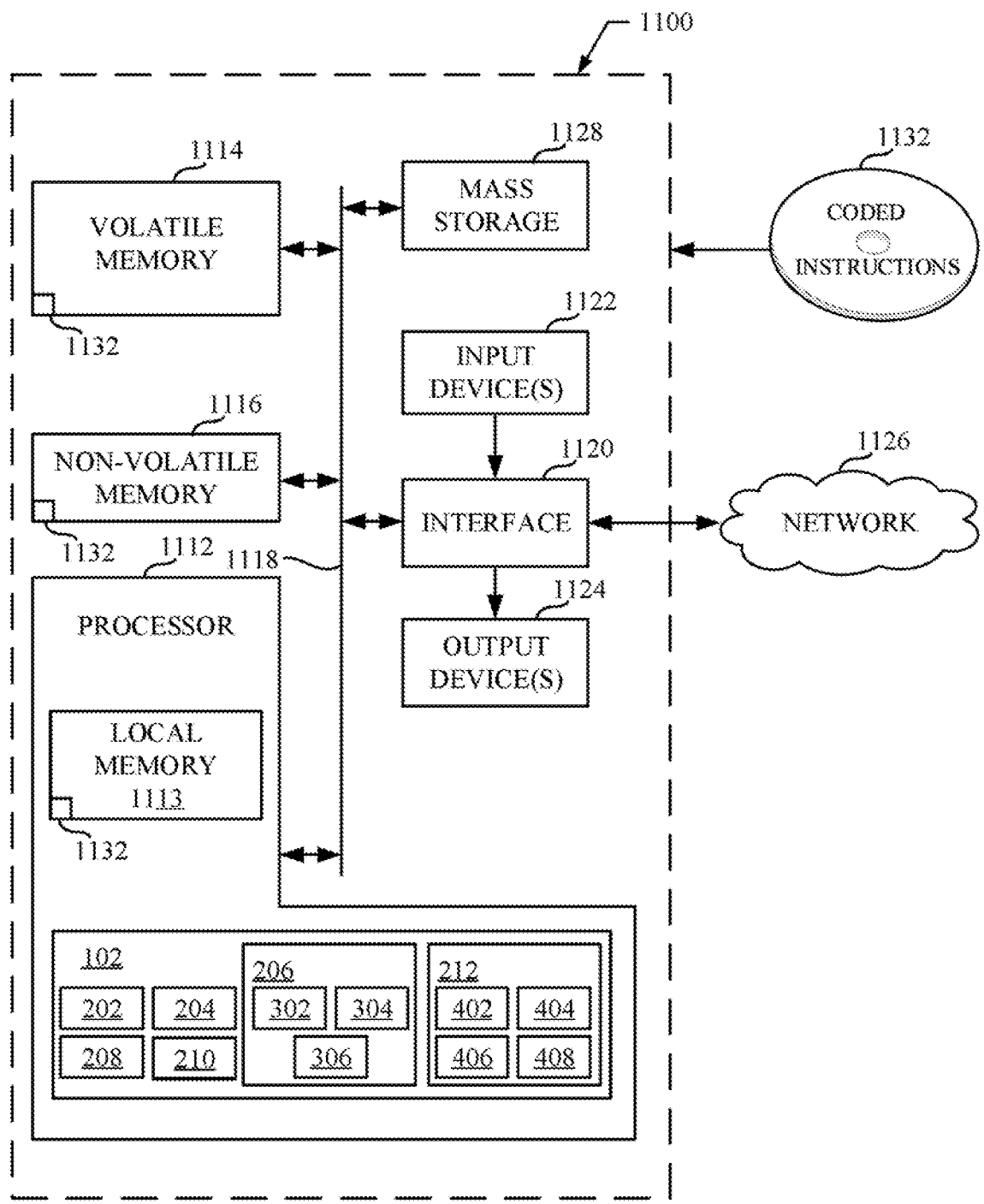
FIG. 11 is a block diagram of an example processor platform structured to execute the instructions of FIGS. 8, 9, and/or 10 to implement the drift detector of FIG. 1.

FIG. 11 is a block diagram of an example processor platform 1100 structured to execute the instructions of FIGS. 8, 9, and/or 10 to implement the drift detector 102 of FIG. 1. The processor platform 1100 can be, for example, a server, a personal computer, a workstation, a self learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example deployment interface 202, the example resource parser 204, the example resource drift determiner 206, the example report generator 208, the example report database 210, the example deployment drift determiner 212, and/or, more generally, the example drift detector 102 of FIG. 1, the example configuration model determiner 302, the example inventory model determiner 304, the example resource drift analyzer 306, and/or, more generally, the example resource drift determiner 206 of FIGS. 2 and/or 3, the example resource drift interface 402, the example drift identifier 404, the example drift database 406, the example deployment drift analyzer 408, and/or, more generally, the example deployment drift determiner 212 of FIGS. 2 and/or 4.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 8, 9, and/or 10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that detect a drift of a resource in a cloud-agnostic system. The disclosed methods, apparatus and articles of manufacture improve the efficiency of using a computing device by analyzing a cloud-agnostic blueprint to determine a configuration model of a resource in the cloud-agnostic blueprint. In addition, the disclosed methods, apparatus and articles of manufacture determine an inventory model of the resource as deployed in a cloud-agnostic system. Examples disclosed herein enable drift detection in a cloud-agnostic system by preforming analysis on the configuration model and the inventory model. Example analysis includes a difference function in which the nodes of the configuration model are compared with the nodes of the inventory model, and the degree of the edges (e.g., relationships) in the configuration model are compared with the degree of the edges (e.g., relationships) in the inventory model. The disclosed methods, apparatus and articles of manufacture are accordingly directed to one or more improvement(s) in the functioning of a computer.

Example methods, apparatus, systems, and articles of manufacture to detect drift in a hybrid cloud environment are disclosed herein. Further examples and combinations thereof include the following:

Example 1 includes an apparatus to detect drift in a hybrid cloud environment, the apparatus comprising a configuration model determiner to, after deployment of a blueprint in the hybrid cloud environment, generate a first model including first relationships of a first plurality of resources corresponding to the blueprint, the blueprint including a plurality of properties in which at least one of the plurality of properties is agnostic of type of cloud, an inventory model determiner to generate a second model including second relationships of a second plurality of resources as deployed in the hybrid cloud environment based on the blueprint, and a drift determiner to determine a drift value based on the first relationships and the second relationships, the drift value representative of a difference between the first relationships and the second relationships.

Example 2 includes the apparatus of example 1, further including a report generator to generate a report indicating whether the drift value is determined by the drift determiner.

Example 3 includes the apparatus of example 1, wherein the drift value is a first drift value, and the drift determiner to determine a second drift value based on a third plurality of resources in the blueprint and a fourth plurality of resources in the hybrid cloud environment.

Example 4 includes the apparatus of example 3, wherein the drift determiner is to determine a drift value as a sum of the first drift value and the second drift value.

Example 5 includes the apparatus of example 1, wherein the first relationships are a first set of edges related to the first plurality of resources, the second relationships are a second set of edges of the second plurality of resources, the first plurality of resources are a first set of vertices in the blueprint, and the second plurality of resources are a second set of vertices as deployed in the hybrid cloud environment.

Example 6 includes the apparatus of example 5, wherein the drift determiner determines the drift value by comparing first properties of the first set of vertices with second properties of the second set of vertices, and determining a difference between a first degree of the first set of edges and a second degree of the second set of edges.

Example 7 includes the apparatus of example 1, wherein the first model is a first undirected graph, and the second model is a second undirected graph.

Example 8 includes the apparatus of example 1, wherein the drift value indicates a deviation between the first relationships of the first plurality of resources in the blueprint and the second plurality of resources as deployed in the hybrid cloud environment, respectively.

Example 9 includes a computer readable medium comprising instructions which, when executed, cause at least one processor to at least generate, after deployment of a blueprint in a hybrid cloud environment, a first model including first relationships of a first plurality of resources corresponding to the blueprint, the blueprint including a plurality of properties in which at least one of the plurality of properties is agnostic of type of cloud, generate a second model including second relationships of a second plurality of resources as deployed in the hybrid cloud environment based on the blueprint, and determine a drift value based on the first relationships and the second relationships, the drift value representative of a difference between the first relationships and the second relationships.

Example 10 includes the computer readable medium of example 9, wherein the instructions, when executed, further cause the at least one processor to generate a report indicating whether the drift value is determined.

Example 11 includes the computer readable medium of example 9, wherein the drift value is a first drill value, and wherein the instructions, when executed, further cause the at least one processor to determine a second drift value based on a third plurality of resources in the blueprint and a fourth plurality of resources in the hybrid cloud environment.

Example 12 includes the computer readable medium of example 11, wherein the instructions, when executed, further cause the at least one processor to determine a summed drift value as a sum of the first drift value and the second drift value.

Example 13 includes the computer readable medium of example 9, wherein the first relationships are a first set of edges related to the first plurality of resources, the second relationships are a second set of edges of the second plurality of resources, the first plurality of resources are a first set of vertices in the blueprint, and the second plurality of resources are a second set of vertices as deployed in a hybrid cloud environment.

Example 14 includes the computer readable medium of example 13, wherein the drift value is determined by comparing first properties of the first set of vertices with second properties of the second set of vertices, and determining a difference between a first degree of the first set of edges and a second degree of the second set of edges.

Example 15 includes the computer readable medium of example 9, wherein the first model is a first undirected graph, and the second model is a second undirected graph.

Example 16 includes the computer readable medium of example 9, wherein the drift value indicates a deviation between the first relationships of the first plurality of resources in the blueprint and the second plurality of resources as deployed in the hybrid cloud environment, respectively.

Example 17 includes a method to detect drift in a hybrid cloud environment, the method comprising generating, after deployment of a blueprint in a hybrid cloud environment, a first model including first relationships of a first plurality of resources corresponding to the blueprint, the blueprint including a plurality of properties in which at least one of the plurality of properties is agnostic of type of cloud, generating a second model including second relationships of a second plurality of resources as deployed in the hybrid cloud environment based on the blueprint, and determining a drift value based on the first relationships and the second relationships, the drift value representative of a difference between the first relationships and the second relationships.

Example 18 includes the method of example 17, further including generating a report indicating whether the drift value is determined.

Example 19 includes the method of example 17, wherein the drift value is a first drift value, further including determining a second drift value based on a third plurality of resources in the blueprint and a fourth plurality of resources in the hybrid cloud environment.

Example 20 includes the method of example 19, further including determining a summed drift value as a sum of the first drift value and the second drift value.

Example 21 includes the method of example 17, wherein the first relationships are a first set of edges related to the first plurality of resources, the second relationships are a second set of edges of the second plurality of resources, the first plurality of resources are a first set of vertices in the blueprint, and the second plurality of resources are a second set of vertices as deployed in the hybrid cloud environment.

Example 22 includes the method of example 21, wherein the drift value is determined by comparing first properties of the first set of vertices with second properties of the second set of vertices, and determining a difference between a first degree of the first set of edges and a second degree of the second set of edges.

Example 23 includes the method of example 17, wherein the first model is a first undirected graph, and the second model is a second undirected graph.

Example 24 includes the method of example 17, wherein the drift value indicates a deviation between the first relationships of the first plurality of resources in the blueprint and the second plurality of resources as deployed in the hybrid cloud environment, respectively.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to detect drift in a hybrid cloud environment that is to include more than one type of cloud, the apparatus comprising:
   at least one non-transitory computer readable medium to store a blueprint, the blueprint to define properties for a first plurality of resources, the properties to include at least a first property for a corresponding one of the first plurality of resources, the first property set to a cloud-agnostic value that is applicable to more than one cloud vendor;
   instructions in the apparatus; and
   processor circuitry to execute the instructions to at least:
      during deployment of the first plurality of resources in the hybrid cloud environment, access a database to determine a cloud-specific value corresponding to the first property, the cloud-specific value specific to a cloud vendor of a type of cloud in which the corresponding one of the first plurality of resources is to be deployed;
      update the blueprint to change the first property from the cloud-agnostic value to the cloud-specific value;

generate a first model representative of the first plurality of resources in the deployment, the first model including first relationships between the first plurality of resources;
generate a second model representative of a second plurality of resources as deployed in the hybrid cloud environment, the second model including second relationships between the second plurality of resources, the second model to account for deviations between the second plurality of resources and the first plurality of resources;
determine, based on the first relationships and the second relationships, a drift value representative of the deviations between the second plurality of resources and the first plurality of resources; and
reduce the drift value by synchronizing the second plurality of resources and the blueprint.

2. The apparatus of claim 1, wherein the processor circuitry is to execute the instructions to generate a report indicating whether the drift value has been determined.

3. The apparatus of claim 1, wherein the drift value is a first drift value, and the processor circuitry is to execute the instructions to determine a second drift value based on a third plurality of resources defined in the blueprint and a fourth plurality of resources as deployed in the hybrid cloud environment.

4. The apparatus of claim 3, wherein the processor circuitry is to execute the instructions to determine a summed drift value as a sum of the first drift value and the second drift value.

5. The apparatus of claim 1, wherein the first relationships are represented by a first set of edges related to the first plurality of resources, the second relationships are represented by a second set of edges of the second plurality of resources, the first plurality of resources defined in the blueprint are represented by a first set of vertices, and the second plurality of resources as deployed in the hybrid cloud environment are represented by a second set of vertices.

6. The apparatus of claim 5, wherein the processor circuitry is to execute the instructions to:
compare second properties of the first set of vertices with third properties of the second set of vertices; and
determine a difference between a first degree of the first set of edges and a second degree of the second set of edges.

7. The apparatus of claim 1, wherein the first model is implemented as a first undirected graph and the second model is implemented as a second undirected graph.

8. The apparatus of claim 1, wherein the drift value is representative of a difference between the first relationships and the second relationships.

9. A non-transitory computer readable medium comprising instructions which, when executed, cause at least one processor to at least:
access a blueprint, the blueprint to define properties for a first plurality of resources, a first resource of the first plurality of resources to include a first property set to a cloud-agnostic value that is applicable to more than one cloud vendor;
during deployment of the first plurality of resources in a hybrid cloud environment, access a database to determine a cloud-specific value corresponding to the first property, the cloud-specific value specific to a cloud vendor of a type of cloud in which the first resource is to be deployed;
update the blueprint to change the first property from the cloud-agnostic value to the cloud-specific value;

generate a first model representative of the first plurality of resources in the deployment, the first model including first relationships between the first plurality of resources;
generate a second model representative of a second plurality of resources as deployed in the hybrid cloud environment, the second model including second relationships between the second plurality of resources, the second model accounting for deviations between the second plurality of resources and the first plurality of resources;
determine, based on the first relationships and the second relationships, a drift value indicative of the deviations between the second plurality of resources and the first plurality of resources; and
reduce the drift value by synchronizing the second plurality of resources and the blueprint.

10. The non-transitory computer readable medium of claim 9, wherein the instructions cause the at least one processor to generate a report indicating whether the drift value has been determined.

11. The non-transitory computer readable medium of claim 9, wherein the drift value is a first drift value and the instructions cause the at least one processor to determine a second drift value based on a third plurality of resources defined in the blueprint and a fourth plurality of resources as deployed in the hybrid cloud environment.

12. The non-transitory computer readable medium of claim 11, wherein the instructions cause the at least one processor to determine a summed drift value as a sum of the first drift value and the second drift value.

13. The non-transitory computer readable medium of claim 9, wherein the first relationships are represented by a first set of edges related to the first plurality of resources, the second relationships are represented by a second set of edges of the second plurality of resources, the first plurality of resources defined in the blueprint are represented by a first set of vertices, and the second plurality of resources as deployed in the hybrid cloud environment are represented by a second set of vertices.

14. The non-transitory computer readable medium of claim 13, wherein the instructions cause the at least one processor to:
compare second properties of the first set of vertices with third properties of the second set of vertices; and
determine a difference between a first degree of the first set of edges and a second degree of the second set of edges.

15. The non-transitory computer readable medium of claim 9, wherein the first model is implemented by a first undirected graph and the second model is implemented by a second undirected graph.

16. The non-transitory computer readable medium of claim 9, wherein the drift value is representative of a difference between the first relationships and the second relationships.

17. A method to detect drift in a hybrid cloud environment including more than one type of cloud, the method comprising:
accessing a blueprint, the blueprint to define properties for a first plurality of resources, at least a first property for a corresponding one of the first plurality of resources set to a cloud-agnostic value, the cloud-agnostic value applicable to more than one cloud vendor;
during deployment of the first plurality of resources in the hybrid cloud environment, accessing a database to determine a cloud-specific value corresponding to the first property, the cloud-specific value specific to a cloud vendor of a type of cloud in which the corresponding one of the first plurality of resources is to be deployed;

updating, by executing an instruction with a processor, the blueprint to change the first property from the cloud-agnostic value to the cloud-specific value;

generating, by executing an instruction with the processor, a first model representative of the first plurality of resources in the deployment, the first model including first relationships between the first plurality of resources;

generating, by executing an instruction with the processor, a second model representative of a second plurality of resources as deployed in the hybrid cloud environment, the second model including second relationships between the second plurality of resources, the second model accounting for deviations between the second plurality of resources and the first plurality of resources;

determining, by executing an instruction with the processor and based on the first relationships and the second relationships, a drift value indicative of the deviations between the second plurality of resources and the first plurality of resources; and reducing the drift value by synchronizing the second plurality of resources and the blueprint.

18. The method of claim 17, further including generating a report indicating whether the drift value has been determined.

19. The method of claim 17, wherein the drift value is a first drift value and the method further includes determining a second drift value based on a third plurality of resources defined in the blueprint and a fourth plurality of resources as deployed in the hybrid cloud environment.

20. The method of claim 19, further including determining a summed drift value as a sum of the first drift value and the second drift value.

21. The method of claim 17, wherein the first relationships are represented by a first set of edges related to the first plurality of resources, the second relationships are represented by a second set of edges of the second plurality of resources, the first plurality of resources defined in the blueprint are represented by a first set of vertices, and the second plurality of resources as deployed in the hybrid cloud environment are represented by a second set of vertices.

22. The method of claim 21, further including:
comparing second properties of the first set of vertices with third properties of the second set of vertices; and
determining a difference between a first degree of the first set of edges and a second degree of the second set of edges.

23. The method of claim 17, wherein the first model is implemented by a first undirected graph and the second model is implemented by a second undirected graph.

24. The method of claim 17, wherein the drift value is representative of a difference between the first relationships and the second relationships.

* * * * *